United States Patent
Clark et al.

(10) Patent No.: US 7,613,860 B2
(45) Date of Patent: Nov. 3, 2009

(54) PRIORITIZATION OF INTERRUPTS IN A STORAGE CONTROLLER BASED ON INTERRUPT CONTROL DIRECTIVES RECEIVED FROM HOSTS

(75) Inventors: Brian Dow Clark, Tucson, AZ (US); Juan Alonso Coronado, Tucson, AZ (US); Beth Ann Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 11/772,742

(22) Filed: Jul. 2, 2007

(65) Prior Publication Data

US 2009/0013119 A1    Jan. 8, 2009

(51) Int. Cl.
G06F 13/24    (2006.01)
G06F 13/26    (2006.01)
G06F 13/36    (2006.01)

(52) U.S. Cl. .................. 710/260; 710/117; 710/124; 710/264

(58) Field of Classification Search ............. 710/260, 710/117, 124, 264
See application file for complete search history.

(56) References Cited

U.S. PATENT DOCUMENTS

| | | | |
|---|---|---|---|
| 5,542,076 | A | 7/1996 | Benson et al. |
| 5,671,365 | A * | 9/1997 | Binford et al. .............. 710/100 |
| 5,740,467 | A * | 4/1998 | Chmielecki et al. ........... 710/56 |
| 6,081,867 | A | 6/2000 | Cox |
| 6,480,918 | B1 | 11/2002 | McKenney et al. |
| 6,574,694 | B1 | 6/2003 | Chen et al. |
| 6,615,305 | B1 | 9/2003 | Olesen et al. |
| 6,651,126 | B1 | 11/2003 | Cantrell et al. |
| 7,054,972 | B2 | 5/2006 | Parry et al. |
| 7,065,598 | B2 * | 6/2006 | Connor et al. .............. 710/260 |
| 2006/0036790 | A1 | 2/2006 | Peterson et al. |
| 2006/0106964 | A1 | 5/2006 | Clark et al. |
| 2006/0112208 | A1 | 5/2006 | Accapadi et al. |

FOREIGN PATENT DOCUMENTS

DE    101 60 298 A1    6/2003

OTHER PUBLICATIONS

U.S. Patent application entitled "Apparatus and Method to Control Access to Stored Information", U.S. Appl. No. 11/751,251, filed May 21, 2007, with IBM Docket No. TUC920060207US1, by inventors B.D. Clark, J.A. Coronado, and B.A. Peterson.

(Continued)

*Primary Examiner*—Paul R Myers
*Assistant Examiner*—Jeremy S Cerullo
(74) *Attorney, Agent, or Firm*—Rabindranath Dutta; Konrad Raynes & Victor LLP

(57) ABSTRACT

A storage controller receives an interrupt control directive from a host. The storage controller generates a first plurality of interrupts, in response to access requests received from the host for at least one storage device coupled to the storage controller, wherein the first plurality of interrupts indicates whether access to the at least one storage device is allowed to the host. The storage controller generates a second plurality of interrupts, wherein the second plurality of interrupts comprises unsolicited interrupts for the host that are different from the first plurality of interrupts. The storage controller controls how many of the first plurality of interrupts and how many of the second plurality interrupts to send to the host, based on the received interrupt control directive.

20 Claims, 6 Drawing Sheets

OTHER PUBLICATIONS

U.S. Patent application entitled "Prioritization of Interrupts in a Storage Controller Based on Interrupt Control Directives Received from Hosts", Serial No. unknown, filed Jul. 2, 2007, with IBM Docket No. TUC920060204US1, by inventors B.D. Clark, J.A. Coronado, and B.A. Peterson, U.S. Appl. No. 11/772,734.

PCT International Search Report and Written Opinion (Date of Mailing: Oct. 9, 2008) for Application No. PCT/ EP2008/058148 filed Jun. 26, 2008.

English Translation of German Patent No. DE10160298 description, claims and abstract.

* cited by examiner

PRIORITIZATION OF INTERRUPTS IN A STORAGE CONTROLLER BASED ON INTERRUPT CONTROL DIRECTIVES RECEIVED FROM HOSTS

BACKGROUND

1. Field

The disclosure relates to the prioritization of interrupts in a storage controller based on interrupt control directives received from hosts.

2. Background

Certain information technology storage systems may include a storage controller that is coupled to a plurality of hosts and a plurality of storage devices. The storage controller controls the access of the hosts to the plurality of storage devices by maintaining logical locks corresponding to the storage devices. When a host sends a command to the storage controller to access a storage device, the storage controller determines whether the storage device is already locked for access by another host. If so, the storage controller may make the host wait for access to the storage device. In order to indicate status to the host, the storage controller may send an interrupt in response to the command, wherein the interrupt may be referred to as an "interrupt responsive to an access request" or an "attention interrupt". For example, if the storage controller determines that the storage device is no longer locked for access by another host, the storage controller may determine which of a plurality of waiting hosts may now have access to the storage device. Then the storage controller may send the interrupt responsive to the access request to the determined host, where the interrupt responsive to the access request indicates to the determined host that the access to the storage device may be performed by the determined host. Additionally, if the storage controller determines that the storage device is locked for access by another host then the storage controller may indicate to the host that the command to set a lock was not successful as the response to the command.

In certain systems, when the host attempts to secure a lock via a host command, the response from the storage controller to the host command indicates to the host that the host got the lock. If the host cannot get the lock, the response from the storage controller to the host command indicates to the host that the host did not get the lock. While the host is waiting for the lock the host could not get, the state of the lock may change and the storage controller may raise an attention interrupt for that host to communicate to the host that the lock has been granted. On receiving the attention interrupt, the host may send a "read message" command, and in response may be provided a "lock granted" message. In addition, a host that holds a lock when another host cannot get the lock may be provided with a "contention" attention if the host that holds the lock had requested that the host should be informed of any potential contention attentions for the lock, where the contention attention may be provided via the attention interrupt and read message mechanisms.

In certain situations, the storage controller may asynchronously send other interrupts to the plurality of hosts. These other interrupts may be referred to as unsolicited interrupts as they are generated by the storage controller without being explicitly requested by the hosts. For example, the storage controller may send state change interrupts to the hosts. Other unsolicited interrupts, such as, interrupts that indicate the status of copy operations being performed by the storage controller may also be sent by the storage controller to the hosts.

SUMMARY OF THE PREFERRED EMBODIMENTS

A storage controller receives an interrupt control directive from a host. The storage controller generates a first plurality of interrupts, in response to access requests received from the host for at least one storage device coupled to the storage controller, wherein the first plurality of interrupts indicates whether access to the at least one storage device is allowed to the host. The storage controller generates a second plurality of interrupts, wherein the second plurality of interrupts comprises unsolicited interrupts for the host that are different from the first plurality of interrupts. The storage controller controls how many of the first plurality of interrupts and how many of the second plurality interrupts to send to the host, based on the received interrupt control directive.

In certain embodiments, a predetermined ratio of the first plurality of interrupts and the second plurality of interrupts that are to be sent to the host during a period of time is indicated in the received interrupt control directive. In certain additional embodiments, the second plurality of interrupts comprises state change interrupts.

In additional embodiments, the received interrupt control directive is processed by the storage controller to determine how many of the first plurality of interrupts are waiting to be sent to the host, and to determine how many of the second plurality of interrupts are waiting to be sent to the host. A first predetermined percentage of the first plurality of interrupts that are waiting to be sent to the host are sent to the host. A second predetermined percentage of the second plurality of interrupts that are waiting to be sent to the host are sent to the host, wherein the first predetermined percentage and the second predetermined percentage are indicated in the interrupt control directive. In certain embodiments, the first predetermined percentage and the second predetermined percentage are indicated by the host in the interrupt control directive that is received by the storage controller from the host.

In yet additional embodiments, a plurality of hosts that include the host is coupled to the storage controller, and a plurality of storage devices that include the at least one storage device is coupled to the storage controller. A plurality of locks is maintained by the storage controller to control access to the plurality of storage devices by the plurality of hosts, wherein a selected host of the plurality of hosts is allowed to access a selected storage device of the plurality of storage devices based on a selected lock of the plurality of locks that controls access to the selected storage device.

In certain embodiments, the interrupt control directive is updated in the host. The updated interrupt control directive is sent by the host to the storage controller. The storage controller controls how many of the first plurality of interrupts and how many of the second plurality interrupts to send to host, based on the updated interrupt control directive.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
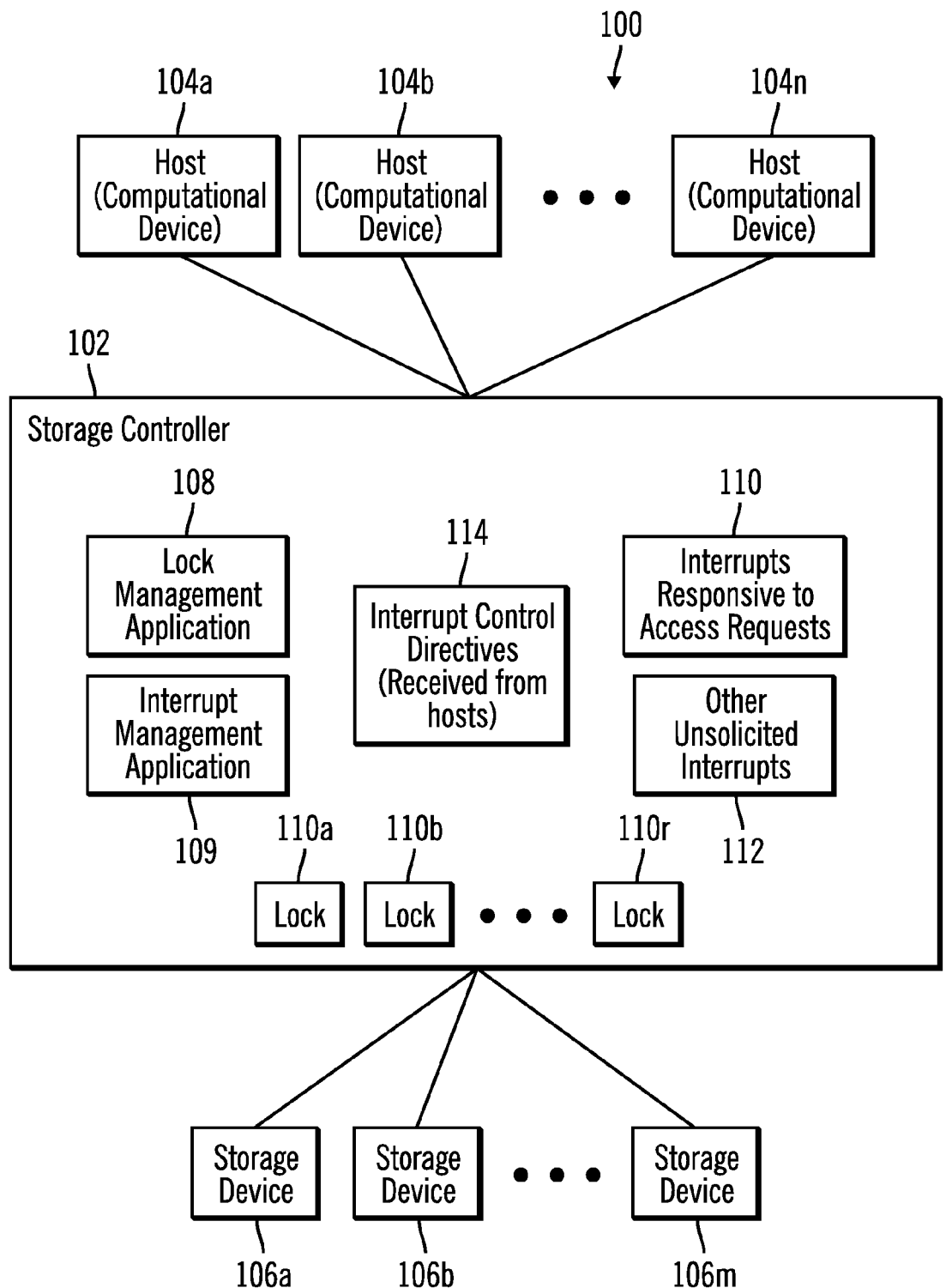
FIG. 1 illustrates a block diagram of a computing environment, in accordance with certain embodiments.

FIG. 1 illustrates a block diagram of a computing environment 100, in accordance with certain embodiments. In the computing environment 100, a storage controller 102 is coupled to a plurality of hosts 104a, 104b, . . . , 104n, and a plurality of storage devices 106a, 106b, . . . , 106m. The coupling between the hosts 104a . . . 104n and the storage controller 102, and the coupling between the storage devices 106a . . . 106m and the storage controller 102 may be either direct or may be over a suitable network known in the art, such as, a storage area network, a local area network, the Internet, a wide area network, etc.

The storage controller 102 and the hosts 104a . . . 104n may comprise any suitable computational device known in the art, such as a server, a personal computer, a workstation, a mainframe computer, a telephony device, or any other suitable computational device. In certain embodiments, the storage controller 102 is a first computational device and an exemplary host, such as host 104a, may comprise a second computational device. The storage devices 106a . . . 106m may include any suitable storage device known in the art, such as direct access storage devices, hard disks, tape drives, etc.

The storage controller 102 includes a lock management application 108 and an interrupt management application 109 that include any suitable applications implemented in software, hardware, firmware or any combination therefore. The lock management application 108 uses a plurality of locks 110a, 100b, . . . 110r to control the access of the hosts 104a . . . 104n to the storage devices 106a . . . 106m. For example, if host 106a has been allowed to access the storage device 106b by the lock management application 108, then the presence of lock 110b may indicate that the storage device 106b is locked. Other hosts besides host 106a are not allowed to access the storage device as long as the lock 110b is maintained for the storage device 106b.

The storage controller 102 may generate different types of interrupts, where the generated interrupts may be sent to the hosts 104a . . . 104n or may wait for being sent to the hosts 104a . . . 104n. A first type of interrupt may be referred to as interrupts responsive to access requests 110, and the interrupts responsive to access requests 110 are generated by the storage controller 102 in response to access requests for storage devices 106a . . . 106m that received from the hosts 104a . . . 104n. A second type of interrupt may be referred to as other unsolicited interrupts 112, and the other unsolicited interrupts 112 may be generated by the storage controller 102 to indicate events such as state changes, the completion of certain tasks, the occurrence of certain events, etc., to the hosts 104a . . . 104n. The other unsolicited interrupts 112 may include any interrupt not specifically requested by the hosts 104a . . . 104n that are generated by the storage controller 102 for sending to the hosts 104a . . . 104n.

The storage controller 102 may include interrupt control directives 114 that are received from the hosts 104a . . . 104n. Information included in the interrupt control directives 114 may have been created or updated by users of the hosts 104a . . . 104n and sent from the hosts 104a . . . 104n to the storage controller 102. The interrupt control directives 114 for a selected host, such as host 104a, may include information on how to control the flow of various types of interrupts to the selected host from the storage controller 102. For example, interrupt control directives corresponding to a selected host may indicate that the a certain ratio should be preserved between interrupts responsive to access requests 110 and other unsolicited interrupts 112 that are sent from the storage controller 102 to the selected host.

In response to access requests for storage devices made by a selected host, if the selected host does not receive interrupts responsive to access requests 110 for a certain period of time, host applications of the selected host may freeze while the host applications wait for access to the storage devices. To prevent the occurrence of such a situation, the selected host may send the information included in the interrupt control directives 114 to the storage controller 102. In certain embodiments the interrupt management application 109 uses the interrupt control directives 114 to control the flow of the interrupts responsive to access requests 110 and other unsolicited interrupts 112 to the hosts 104a . . . 104n.

Figure 2:
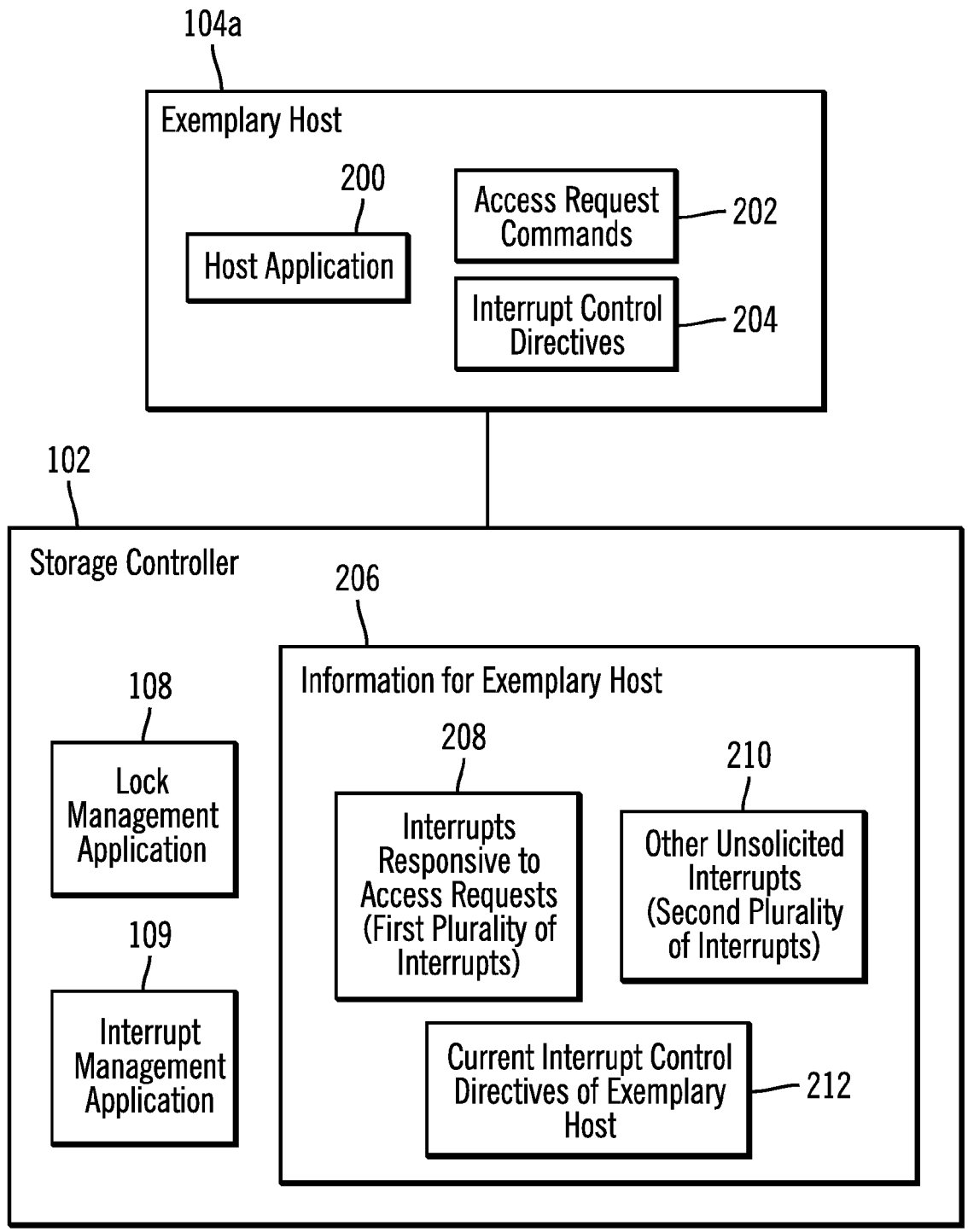
FIG. 2 illustrates a block diagram that shows applications and data structures implemented in an exemplary host and the storage controller of the computing environment, in accordance with certain embodiments.

FIG. 2 illustrates a block diagram that shows applications and data structures implemented in an exemplary host 104a and the storage controller 102 of the computing environment 100, in accordance with certain embodiments. While FIG. 2 shows that the exemplary host is host 104a, the exemplary host may correspond to any of the other hosts 104b . . . 104n shown in FIG. 1.

The exemplary host 104a includes a host application 200, access request commands 202, and interrupt control directives 204. The host application 200 may send the access request commands 202 to the storage controller 102 for accessing the storage devices 106a . . . 106m. The interrupt control directives 204 maintained in the host 104a may be created by a user of the host 104a, and may be periodically updated by the user of the host 104a. For example, in certain embodiments after certain interrupt control directives 204 have been created by a user, the user may at a future time update the interrupt control directives 204 to reflect a new requirement related to the receipt of interrupts at the host 104a. The interrupt control directives 204 are initially sent from the host 104a to the storage controller 102, and updates to the interrupt control directives 204 are propagated from the host 104a to the storage controller 102.

The storage controller 102 maintains information 206 corresponding to the exemplary host 102a. Other hosts 102b . . . 102n have corresponding information associated with them in the storage controller 102. The information 206 may include the interrupts responsive to access requests 208, also referred to as a first plurality of interrupts, and other unsolicited interrupts 210, also referred to as a second plurality of interrupts. The information 206 for the exemplary host 102a may also include the current interrupt control directives 212 of the exemplary host 104 that have been received at the storage controller 102.

The interrupt management application 109 of the storage controller 102, receives at the storage controller 102, an interrupt control directive 204 from the host 104a and stores the interrupt control directive 204 in the current interrupt control directives 212. The storage controller 102 generates a first plurality of interrupts 206, in response to access requests 202 received from the host 104a for at least one storage device coupled to the storage controller 102, wherein the first plurality of interrupts 206 indicates whether access to the at least one storage device is allowed to the host 104a. The storage controller 102 generates a second plurality of interrupts 210, wherein the second plurality of interrupts 210 comprises unsolicited interrupts for the host 104a. The interrupt management application 109 in the storage controller 102 controls how many of the first plurality of interrupts 208 and how many of the second plurality interrupts 210 are to be sent to the host 104a, based on the received interrupt control directive 212.

Figure 3:
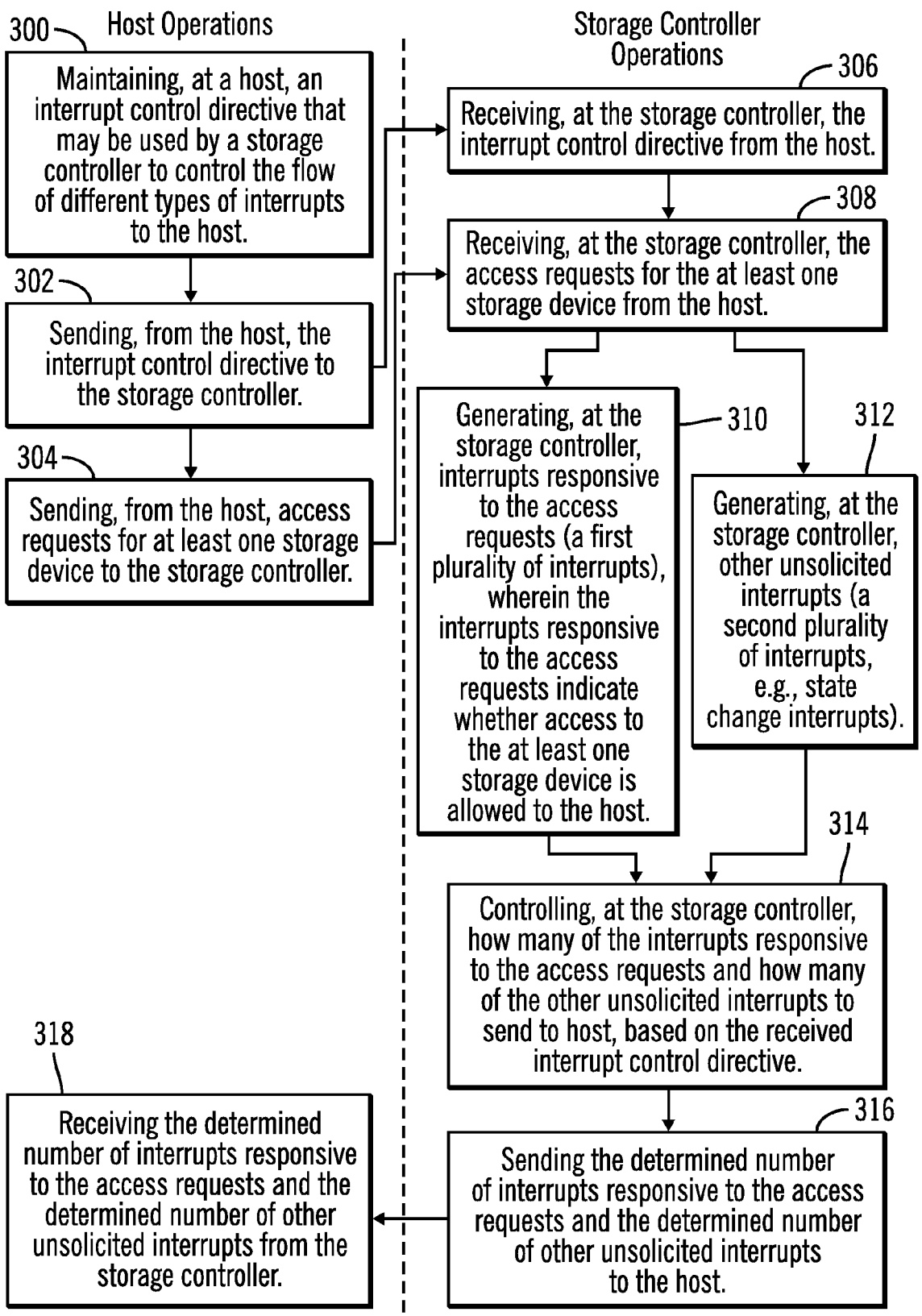
FIG. 3 illustrates operations for the prioritization of interrupts in a storage controller based on interrupt control directives received from hosts, in accordance with certain embodiments.

FIG. 3 illustrates operations for the prioritization of interrupts in a storage controller 102 based on interrupt control directives received from hosts, in accordance with certain embodiments. The operations illustrated in FIG. 3 may be implemented in the hosts 104a . . . 104n and the storage controller 102 of the computing environment 100.

Control starts at block 300, where a host 104a maintains an interrupt control directive 204 that may be used by a storage controller 102 to control the flow of different types of interrupts to the host 104a. The host sends (at block 302) the interrupt control directive 204 to the storage controller 102 and then sends (at block 304) access requests 202 for at least one storage device included in the storage devices 106a . . . 106m to the storage controller 102.

At block 306, the storage controller 102 receives the interrupt control directive 204 from the host 104a. At block 308, the storage controller 102 receives the access requests 202 for the at least one storage device from the host 104a.

Control proceeds to blocks 310 and 312 in parallel from block 308, wherein at block 310 the storage controller 102 generates interrupts responsive to the access requests 208 (a first plurality of interrupts), wherein the interrupts responsive to the access requests 208 indicate whether access to the at least one storage device is allowed to the host 104a. The storage controller 102 also generates (at block 312), other unsolicited interrupts (a second plurality of interrupts).

Control proceeds from block 310 and 312 to block 314, wherein at block 314 the storage controller 102 controls how many of the interrupts responsive to the access requests and how many of the other unsolicited interrupts to send to the host 104a, based on the received interrupt control directive 212. The storage controller 102 sends (at block 316) the determined number of interrupts responsive to the access requests and the determined number of other unsolicited interrupts to the host 104a.

The host 104a receives (at block 318) the determined number of interrupts responsive to the access requests and the determined number of other unsolicited interrupts from the storage controller 102. Since the host 104a has indicated to the storage controller 102 via the interrupt control directives 204, how the flow of the interrupts responsive to the access requests and the other unsolicited interrupts should be managed, the waiting time for the host application 200 may be kept at a manageable level at the host 104a, and the likelihood of performing initial program load operations in the host 104a as a result of non-receipt of interrupts responsive to access requests 208 is reduced.

Figure 4:
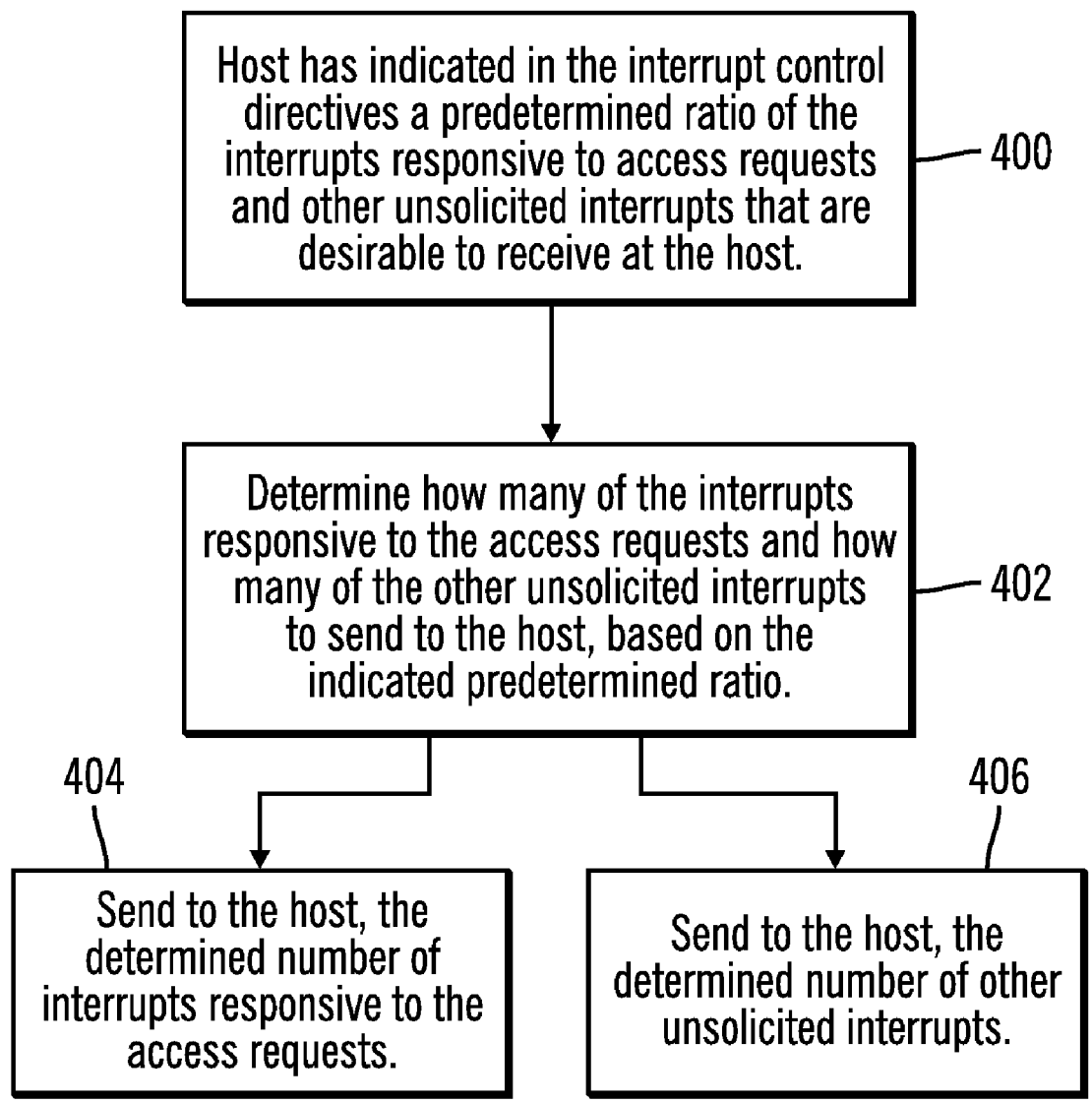
FIG. 4 illustrates operations for selecting a ratio of interrupts responsive to access requests to other unsolicited interrupts for sending to a host, in accordance with certain embodiments.

FIG. 4 illustrates operations for selecting a ratio of interrupts responsive to access requests to other unsolicited interrupts for sending to a host, in accordance with certain embodiments. The operations illustrated in FIG. 4 may be implemented in the storage controller 102 of the computing environment 100.

Control starts at block 400, where the host 104a has indicated in the interrupt control directives 204 a predetermined ratio of the interrupts responsive to access requests and other unsolicited interrupts that are desirable to receive at the host. For example, the host 104a may have indicated that in a group of interrupts sent to the host 104a, the predetermined ratio is 0.5, i.e., for each interrupt responsive to access requests 208 that is sent to the host 104a, two other unsolicited interrupts 210 should also be sent to the host 104a.

Control proceeds to block 402, where the storage controller 102 determines how many of the interrupts responsive to the access requests 208 and how many of the other unsolicited interrupts 210 to send to the host 104a, based on the indicated predetermined ratio. The storage controller 102 sends (at block 404) to the host 104a, the determined number of interrupts that are responsive to the access requests and also sends (at block 406) to the host 104a, the determined number of other unsolicited interrupts.

Therefore FIG. 4 illustrates certain embodiments in which a predetermined ratio of the first plurality of interrupts 208 and the second plurality of interrupts 210 that are to be sent to the host during a period of time is indicated in the received interrupt control directive 212.

Figure 5:
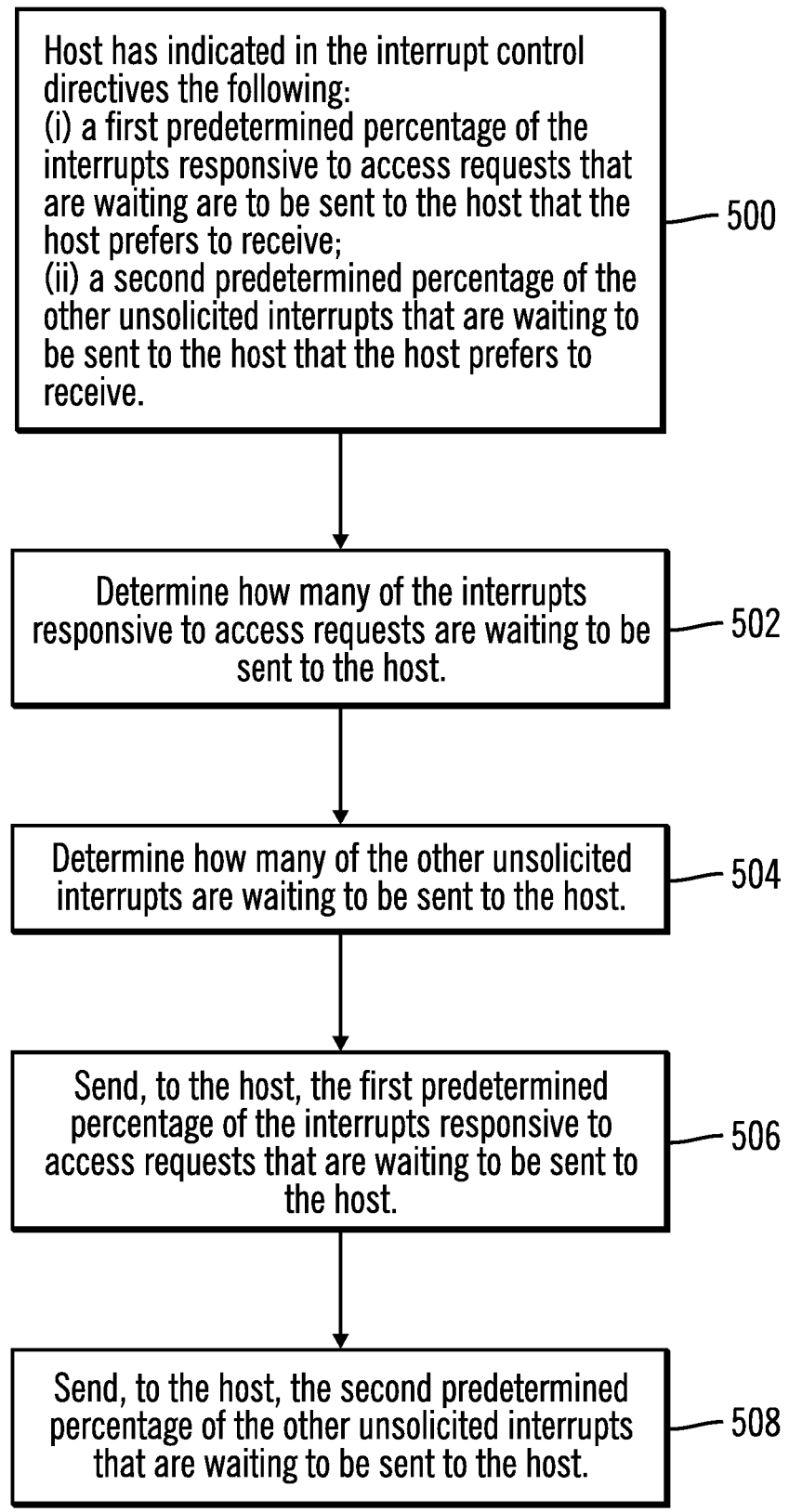
FIG. 5 illustrates operations for sending interrupts to a host, wherein a certain percentage of the interrupts responsive to access requests that are waiting at the storage controller are sent to the host, and a certain percentage of the other unsolicited interrupts that are waiting at the storage controller are sent to the host, in accordance with certain embodiments.

FIG. 5 illustrates operations for sending to a host, a certain percentage of the interrupts responsive to access requests that are waiting at the storage controller 102, and a certain percentage of the other unsolicited interrupts that are waiting at the storage controller 102, in accordance with certain embodiments. The operations illustrated in FIG. 5 may be implemented in the storage controller 102 of the computing environment 100.

Control starts at block 500 where the host 104a has indicated in the interrupt control directives 204 the following:

(i) a first predetermined percentage of the interrupts responsive to access requests 208 that are waiting are to be sent to the host 104a that the host 104a prefers to receive; and (ii) a second predetermined percentage of the other unsolicited interrupts 210 that are waiting to be sent to the host 104a that the host 104a prefers to receive.

Control proceeds to block 502, where the storage controller 102 determines how many of the interrupts responsive to access requests are waiting to be sent to the host 104a. The storage controller 102 also determines (at block 504) how many of the other unsolicited interrupts are waiting to be sent to the host 104a.

The storage controller 102 sends (at block 506) to the host 104a, the first predetermined percentage of the interrupts responsive to access requests that are waiting to be sent to the host 104a. The storage controller 102 also sends (at block 508) to the host, the second predetermined percentage of the other unsolicited interrupts that are waiting to be sent to the host 104a.

Therefore, FIG. 5 illustrates certain embodiments in which the storage controller 102 sends a certain percentage of the different types of interrupts waiting in a queue at the storage controller 102 to the host 104a. For example, the storage controller 102 may in an exemplary embodiment send 20% of the interrupts responsive to access requests 208 that are waiting in a queue at the storage controller 102 and 30% of the other unsolicited interrupts 210 that are waiting in a queue at the storage controller 102.

Certain embodiments control the flow of interrupts responsive to access requests 208 to a host based on interrupt control directives 212 received from the host. By controlling the flow of different types of interrupts in the embodiments, the presence of other unsolicited interrupts 210 cannot prevent the interrupts responsive to access requests 208 from being sent to the host. As a result, the likelihood of the host applications waiting for access to a storage device is reduced.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
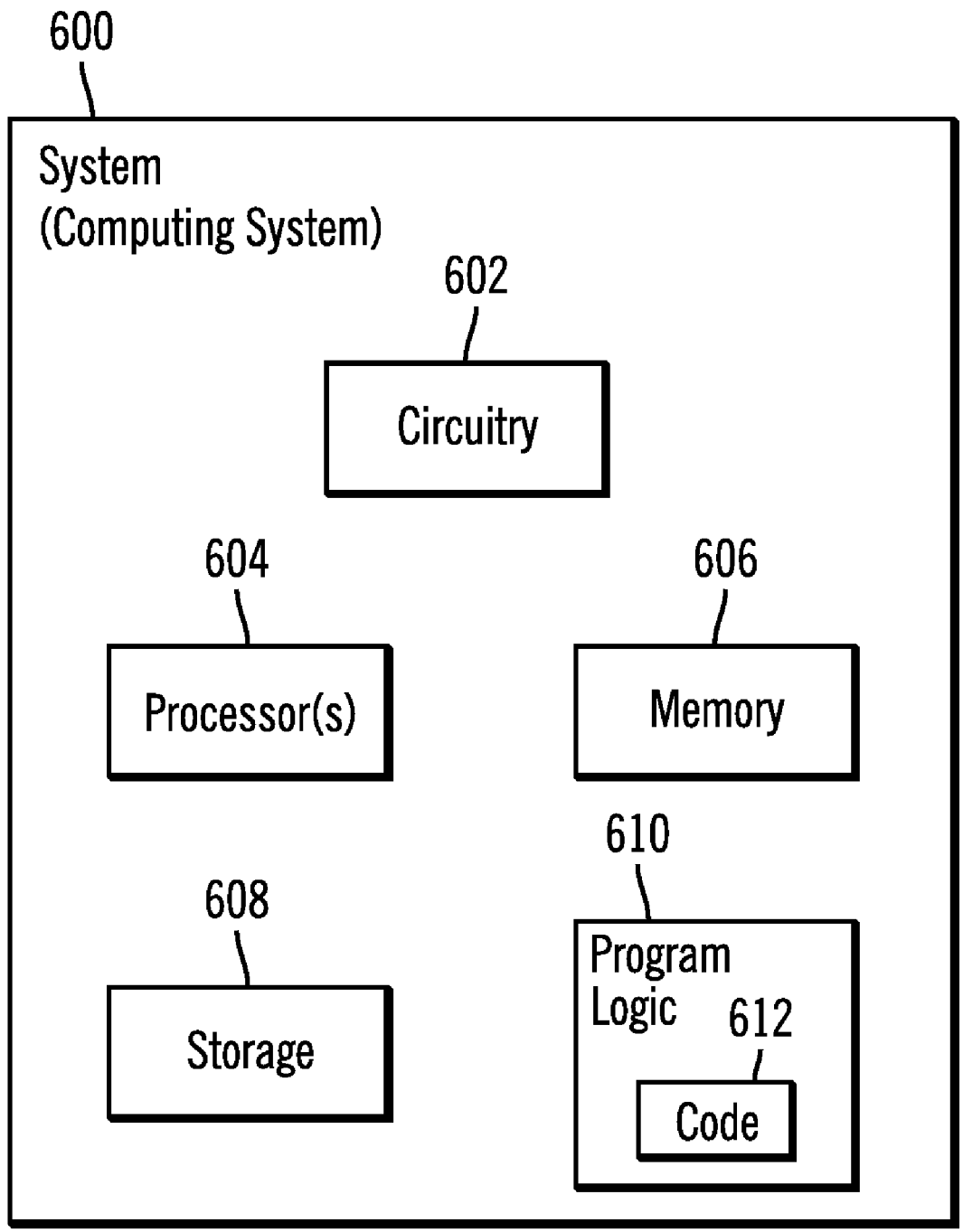
FIG. 6 illustrates a block diagram of a computer architecture in which certain described aspects of the embodiments are implemented.

FIG. 6 illustrates the architecture of computing system 600, wherein in certain embodiments the storage controller 104 and the hosts 102a . . . 102n of the computing environment 100 of FIG. 1 may be implemented in accordance with the architecture of the computing system 600. The computing system 600 may also be referred to as a system, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving, at a storage controller, an interrupt control directive from a host;
   generating, at the storage controller, a first plurality of interrupts, in response to access requests received from the host for at least one storage device coupled to the storage controller, wherein the first plurality of interrupts indicates whether access to the at least one storage device is allowed to the host;
   generating, at the storage controller, a second plurality of interrupts, wherein the second plurality of interrupts comprises unsolicited interrupts for the host that are different from the first plurality of interrupts; and
   controlling, at the storage controller, how many of the first plurality of interrupts and how many of the second plurality interrupts to send to the host, based on the received interrupt control directive, wherein a predetermined ratio of the first plurality of interrupts and the second plurality of interrupts that are to be sent to the host during a period of time is indicated in the received interrupt control directive.

2. The method of claim 1, wherein the received interrupt control directive is processed by the storage controller to perform:
   determining how many of the first plurality of interrupts are waiting to be sent to the host;
   determining how many of the second plurality of interrupts are waiting to be sent to the host;
   sending, to the host, a first predetermined percentage of the first plurality of interrupts that are waiting to be sent to the host; and
   sending, to the host, a second predetermined percentage of the second plurality of interrupts that are waiting to be sent to the host, wherein the first predetermined percentage and the second predetermined percentage are indicated in the interrupt control directive.

3. The method of claim 2, wherein the first predetermined percentage and the second predetermined percentage are indicated by the host in the interrupt control directive that is received by the storage controller from the host.

4. The method of claim 1, wherein:
   a plurality of hosts that include the host is coupled to the storage controller;
   a plurality of storage devices that include the at least one storage device is coupled to the storage controller; and
   a plurality of locks is maintained by the storage controller to control access to the plurality of storage devices by the plurality of hosts, wherein a selected host of the plurality of hosts is allowed to access a selected storage device of the plurality of storage devices based on a selected lock of the plurality of locks that controls access to the selected storage device.

5. The method of claim 1, further comprising:
   updating the interrupt control directive in the host;
   sending, by the host, the updated interrupt control directive, to the storage controller; and
   controlling, at the storage controller, how many of the first plurality of interrupts and how many of the second plurality interrupts to send to host, based on the updated interrupt control directive.

6. The method of claim 1, wherein the second plurality of interrupts comprises state change interrupts.

7. The method of claim 1, wherein:
   the first plurality of interrupts are interrupts that are responsive to access requests;
   the second plurality of interrupts are unsolicited interrupts;
   the host indicates in the interrupt control directive the predetermined ratio of: (a) the interrupts that are responsive to access requests, and (b) the unsolicited interrupts; and
   the predetermined ratio restricts the unsolicited interrupts from preventing the interrupts that are responsive to access requests from being sent to the host.

8. A method for deploying computing infrastructure, comprising integrating computer-readable code into a computer, wherein the code in combination with the computer is capable of performing:
   receiving, at a storage controller, an interrupt control directive from a host; generating, at the storage controller, a first plurality of interrupts, in response to access requests received from the host for at least one storage device coupled to the storage controller, wherein the first plurality of interrupts indicates whether access to the at least one storage device is allowed to the host;
   generating, at the storage controller, a second plurality of interrupts, wherein the second plurality of interrupts comprises unsolicited interrupts for the host that are different from the first plurality of interrupts; and
   controlling, at the storage controller, how many of the first plurality of interrupts and how many of the second plurality interrupts to send to the host, based on the received interrupt control directive, wherein a predetermined ratio of the first plurality of interrupts and the second plurality of interrupts that are to be sent to the host during a period of time is indicated in the received interrupt control directive.

9. The method for deploying computing infrastructure of claim 8, wherein the received interrupt control directive is processed by the storage controller to perform:
determining how many of the first plurality of interrupts are waiting to be sent to the host;
determining how many of the second plurality of interrupts are waiting to be sent to the host;
sending, to the host, a first predetermined percentage of the first plurality of interrupts that are waiting to be sent to the host; and
sending, to the host, a second predetermined percentage of the second plurality of interrupts that are waiting to be sent to the host, wherein the first predetermined percentage and the second predetermined percentage are indicated in the interrupt control directive.

10. The method for deploying computing infrastructure of claim 9, wherein the first predetermined percentage and the second predetermined percentage are indicated by the host in the interrupt control directive that is received by the storage controller from the host.

11. The method for deploying computing infrastructure of claim 8, wherein:
a plurality of hosts that include the host is coupled to the storage controller;
a plurality of storage devices that include the at least one storage device is coupled to the storage controller;
a plurality of locks is maintained by the storage controller to control access to the plurality of storage devices by the plurality of hosts, wherein a selected host of the plurality of hosts is allowed to access a selected storage device of the plurality of storage devices based on a selected lock of the plurality of locks that controls access to the selected storage device.

12. The method for deploying computing infrastructure of claim 8, wherein the code in combination with the computer is capable of performing:
updating the interrupt control directive in the host;
sending, by the host, the updated interrupt control directive, to the storage controller; and
controlling, at the storage controller, how many of the first plurality of interrupts and how many of the second plurality interrupts to send to host, based on the updated interrupt control directive.

13. The method for deploying computing infrastructure of claim 8, wherein the second plurality of interrupts comprises state change interrupts.

14. The method for deploying computing infrastructure of claim 8, wherein:
the first plurality of interrupts are interrupts that are responsive to access requests;
the second plurality of interrupts are unsolicited interrupts;
the host indicates in the interrupt control directive the predetermined ratio of: (a) the interrupts that are responsive to access requests, and (b) the unsolicited interrupts; and
the predetermined ratio restricts the unsolicited interrupts from preventing the interrupts that are responsive to access requests from being sent to the host.

15. A method, comprising:
sending, from a host, an interrupt control directive to a storage controller;
sending, from the host, access requests for at least one at least one storage device coupled to the storage controller, wherein in response to the access requests the storage controller generates a first plurality of interrupts that indicates whether access to the at least one storage device is allowed to the host, wherein the storage controller generates a second plurality of interrupts, wherein the second plurality of interrupts comprises unsolicited interrupts for the host that are different from the first plurality of interrupts, and wherein the storage controller determines how many of the first plurality of interrupts and how many of the second plurality of interrupts to send to the host, based on the interrupt control directive; and
receiving, at the host, those interrupts determined by the storage controller to send to the host, wherein the interrupt control directive sent by the host to the storage controller indicates a predetermined ratio of the first plurality of interrupts and the second plurality of interrupts that are to be sent to the host during a period of time.

16. The method of claim 15, wherein the storage controller processes the interrupt control directive to determine how many of the first plurality of interrupts are waiting to be sent to the host, and to determine how many of the second plurality of interrupts are waiting to be sent to the host, the method further comprising:
receiving, at the host, a first predetermined percentage of the first plurality of interrupts that are waiting to be sent to the host; and
receiving, at the host, a second predetermined percentage of the second plurality of interrupts that are waiting to be sent to the host, wherein the first predetermined percentage and the second predetermined percentage are indicated in the interrupt control directive.

17. The method of claim 16, wherein the first predetermined percentage and the second predetermined percentage are indicated by the host in the interrupt control directive sent by the host to the storage controller.

18. The method of claim 15, wherein:
a plurality of hosts that include the host is coupled to the storage controller;
a plurality of storage devices that include the at least one storage device is coupled to the storage controller; and
a plurality of locks is maintained by the storage controller to control access to the plurality of storage devices by the plurality of hosts, wherein a selected host of the plurality of hosts is allowed to access a selected storage device of the plurality of storage devices based on a selected lock of the plurality of locks that controls access to the selected storage device.

19. The method of claim 15, further comprising:
updating the interrupt control directive in the host; and
sending, by the host, the updated interrupt control directive, to the storage controller, wherein the storage controller controls how many of the first plurality of interrupts and how many of the second plurality interrupts to send to host, based on the updated interrupt control directive.

20. The method of claim 15, wherein:
the first plurality of interrupts are interrupts that are responsive to access requests;
the second plurality of interrupts are unsolicited interrupts;
the host indicates in the interrupt control directive the predetermined ratio of: (a) the interrupts that are responsive to access requests, and (b) the unsolicited interrupts; and
the predetermined ratio restricts the unsolicited interrupts from preventing the interrupts that are responsive to access requests from being sent to the host.

* * * * *